(12) United States Patent
MacLeod et al.

(10) Patent No.: US 10,630,487 B2
(45) Date of Patent: Apr. 21, 2020

(54) SYSTEM AND METHOD FOR ISSUING A CERTIFICATE TO PERMIT ACCESS TO INFORMATION

(71) Applicant: BOOZ ALLEN HAMILTON INC., McLean, VA (US)

(72) Inventors: William MacLeod, Fort Washington, MD (US); James Ter Beest, Washington, DC (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 15/827,581

(22) Filed: Nov. 30, 2017

(65) Prior Publication Data

US 2019/0165951 A1    May 30, 2019

(51) Int. Cl.
*H04L 29/06* (2006.01)
*H04L 9/32* (2006.01)
(Continued)

(52) U.S. Cl.
CPC ............ *H04L 9/3263* (2013.01); *H04L 9/006* (2013.01); *H04L 9/14* (2013.01); *H04L 9/30* (2013.01);
(Continued)

(58) Field of Classification Search
CPC ... H04L 9/3263; H04L 9/3231; H04L 9/3268; H04L 63/00; H04L 9/006; H04L 9/30; H04L 9/14
See application file for complete search history.

(56) References Cited

U.S. PATENT DOCUMENTS 8,639,926 B2 * 1/2014 Brown ................. G06F 21/31
455/411
8,719,921 B2 * 5/2014 Johansson ............ G06F 21/10
725/104
(Continued)

OTHER PUBLICATIONS

M. Pritikin et al. "Simple Certificate Enrollment Protocol Draft-Nourse-Scep 23"; https://tools.ietf.org/html/draft-nourse-scep-23; Sep. 7, 2011, 43 pages.
(Continued)

*Primary Examiner* — Michael R Vaughan
(74) *Attorney, Agent, or Firm* — Buchanan Ingersoll & Rooney PC (57) ABSTRACT

A system for issuing a certificate to permit access to information, the system including: an identification service to receive dynamic biometric and contextual data regarding an individual located within an area, and to receive at least one of stored identity, biometric, and contextual data for a given individual to provide an identity estimate and a level of certainty indicator of a match based on comparison of the biometric and contextual data regarding the individual to the biometric and contextual data regarding the subscribers; a registration authority to receive the identity estimate and the level of certainty indicator, and to determine whether a certificate should be issued to an individual based on the level of certainty indicator; and a certificate authority to issue the certificate upon determining that the certificate should be issued, wherein the certificate will allow an individual to use the computing device to access an information system.

31 Claims, 8 Drawing Sheets

(51) Int. Cl.
*H04L 9/30* (2006.01)
*H04L 9/14* (2006.01)
*H04L 9/00* (2006.01)
(52) U.S. Cl.
CPC .......... *H04L 9/3231* (2013.01); *H04L 9/3268* (2013.01); *H04L 63/00* (2013.01)

(56) References Cited

U.S. PATENT DOCUMENTS

| | | | | |
|---|---|---|---|---|
| 8,925,053 | B1* | 12/2014 | Mehta | G06F 21/31 |
| | | | | 713/155 |
| 9,137,247 | B2* | 9/2015 | Smith | G06F 21/32 |
| 9,160,730 | B2* | 10/2015 | Sheller | H04L 63/08 |
| 9,231,765 | B2* | 1/2016 | Flautner | H04L 9/3226 |
| 9,615,257 | B2* | 4/2017 | Lazaridis | H04L 63/0492 |
| 2004/0199769 | A1* | 10/2004 | Proudler | G06F 21/46 |
| | | | | 713/169 |
| 2005/0057339 | A1* | 3/2005 | Ikehara | G06F 3/03543 |
| | | | | 340/5.52 |
| 2005/0204038 | A1* | 9/2005 | Medvinsky | G06F 21/10 |
| | | | | 709/225 |
| 2006/0095790 | A1* | 5/2006 | Nguyen | G06Q 20/3224 |
| | | | | 713/186 |
| 2006/0265340 | A1* | 11/2006 | Ziv | G06Q 20/341 |
| | | | | 705/76 |
| 2007/0198849 | A1* | 8/2007 | Mozer | G06F 21/32 |
| | | | | 713/186 |
| 2008/0300877 | A1* | 12/2008 | Gilbert | G06Q 40/00 |
| | | | | 704/246 |
| 2009/0307759 | A1* | 12/2009 | Schnell | G06F 21/10 |
| | | | | 726/4 |
| 2010/0313239 | A1* | 12/2010 | Chakra | G06F 21/6218 |
| | | | | 726/2 |
| 2011/0191834 | A1* | 8/2011 | Singh | G06F 17/00 |
| | | | | 726/6 |
| 2011/0302653 | A1* | 12/2011 | Frantz | G06F 21/552 |
| | | | | 726/22 |
| 2012/0254941 | A1* | 10/2012 | Levien | G06F 21/32 |
| | | | | 726/3 |
| 2012/0254984 | A1* | 10/2012 | Levien | G06F 21/35 |
| | | | | 726/16 |
| 2013/0036458 | A1* | 2/2013 | Liberman | H04L 9/3231 |
| | | | | 726/6 |
| 2013/0133055 | A1* | 5/2013 | Ali | H04L 63/0861 |
| | | | | 726/7 |
| 2013/0198832 | A1* | 8/2013 | Draluk | G06F 21/31 |
| | | | | 726/16 |
| 2014/0002238 | A1* | 1/2014 | Taveau | G07C 9/00087 |
| | | | | 340/5.53 |
| 2014/0189807 | A1* | 7/2014 | Cahill | G06F 21/41 |
| | | | | 726/4 |
| 2014/0250523 | A1* | 9/2014 | Savvides | G06F 21/32 |
| | | | | 726/19 |
| 2014/0282868 | A1* | 9/2014 | Sheller | G06F 21/31 |
| | | | | 726/3 |
| 2014/0283016 | A1* | 9/2014 | Sambamurthy | G06F 21/31 |
| | | | | 726/19 |
| 2014/0366111 | A1* | 12/2014 | Sheller | H04L 63/08 |
| | | | | 726/7 |
| 2015/0189378 | A1* | 7/2015 | Soundararajan | H04N 21/44218 |
| | | | | 725/12 |
| 2015/0373007 | A1* | 12/2015 | Sheller | H04L 63/08 |
| | | | | 726/6 |
| 2016/0127351 | A1* | 5/2016 | Smith | G06F 21/316 |
| | | | | 726/10 |
| 2017/0161578 | A1* | 6/2017 | Ivanisov | G06K 9/00899 |

OTHER PUBLICATIONS

M. Pritikin et al. "Enrollment Over Secure Transport"; https://tools.ietf.org/html/rfc7030, Oct. 2013, 53 pages.
R. Housley, "Cryptographic Message Syntax (CMS)"; https://tools.ietf.org/html/rfc5652, Sep. 2009, 56 pages.
A. McKenzie, "A Software Consulting Service for Network Users", https://tools.ietf.org/html/rfc421, Nov. 27, 1972, 1 page.
P. Grother, "Biometric Specifications for Personal Identity Verification", http://nvlpubs.nist.gov/nistpubs/SpecialPublications/NIST.SP.800-157; NIST Special Publication 800-76-2, NIST National Institute of Standards and Technology, Jul. 2013, 61 pages.
P. Grother, "Guidelines for Derived Personal Identity Verification (PIV) Credentials", http://nvlpubs.nist.gov/nistpubs/SpecialPublications/NIST.SP.800-157; NIST Special Publication 800-157, NIST National Institute of Standards and Technology, Dec. 2014, 33 pages.
J. Schaad et al., "Certificate Management Over CMS (CMC)", https://tools.ietf.org/html/rfc5272; Jun. 2008, 83 pages.
C. Adams et al., "Internet X.509 Public Key Infrastructure Certificate Management Protocol (CMP)", https://tools.ietf.org/html/rfc4210; 95 pages.
International Search Report and Written Opinion of the International Searching Authority (Forms PCT/ISA/220, PCT/ISA/210 and PCT/ISA/237) dated Jan. 15, 2019, by the International Bureau of European Patent Office in corresponding International Application No. PCT/US18/62722. (13 pages).

* cited by examiner

SYSTEM AND METHOD FOR ISSUING A CERTIFICATE TO PERMIT ACCESS TO INFORMATION

FIELD

The present disclosure relates to a system and method for issuing a certificate to permit access to information.

BACKGROUND

In existing systems, logical access to remote information systems is often dependent upon proof of possession of the private key in an asymmetric key pair certified by a trusted third party known as a certificate authority within a Public Key Infrastructure (PKI). Distribution of these certified key pairs, or PKI credentials, for authentication of users is traditionally performed on hardware tokens such as smart cards or key fobs, but can be installed locally in the client device used to access the remote information system in order to improve the user experience. Certifying keys on the hardware token or client device for this purpose necessitates identity vetting by a registration authority to ensure that the possessor of the private key is the individual identified in the PKI credential's X.509 certificate. Some organizations use a derived credential issuance model to issue PKI credentials, wherein proof of possession of a previously-issued hardware token, through electronic authentication, can be used in place of in-person identity vetting to authorize the enrollment of a new PKI credential installed locally on the client device. These derived credential issuance models necessitate the deployment of hardware tokens prior to the issuance of derived credentials. Once in-person identity vetting has been performed for the issuance of the hardware token, further identity vetting is not required for subsequent credentials. Also, in existing systems that use biometric sampling to authorize access to keys stored locally on a client device, the biometric samples are only used to unlock access to resources stored locally on the device and the client device must already be in possession of certified keys in order to authenticate to remote systems.

A paper entitled "Guidelines for Derived Personal Identity Verification (PIV) Credentials" by the National Institute of Standards and Technology, NIST Special Publication 800-157, December 2014, by Hildegard Ferraiolo et al. describes technical guidelines for the implementation of standards-based, secure, reliable, interoperable public key infrastructure (PKI) based identity credentials that are issued by federal departments and agencies to individuals who possess and prove control over a valid PIV card.

A paper entitled "Biometric Specifications for Personal Identity Verification" by the National Institute of Standards and Technology, NIST Special Publication 800-76-2, July 2013, by Patrick Grother et al. describes the Personal Identity Verification (PIV) standard for federal employees and contractors. This paper also describes technical acquisition and formatting specifications for a PIV system, including a PIV card.

A paper entitled "Cryptographic Message Syntax (CMS)" by R. Housley, Network Working Group, September 2009, describes the Cryptographic Message Syntax (CMS) which is used to digitally sign, digest, authenticate, or encrypt arbitrary message content.

A paper entitled "A Software Consulting Service for Network Users" by Alexander McKenzie, Network Working Group, Nov. 27, 1972, describes a software consulting service for network users.

A paper entitled "Enrollment over Secure Transport" by M. Pritikin et al., Internet Engineering Task Force, October 2013, describes certificate enrollment for clients using Certificate Management over CMS (CMC) messages over a secure transport.

A paper entitled "Simple Certificate Enrollment Protocol" by M. Pritikin et al., Internet Engineering Task Force, Sep. 7, 2011, describes the Simple Certificate Enrollment Protocol (SCEP), a Public Key Infrastructure (PKI) communication protocol which leverages existing technology by using PKCS #7 and PKCS #10 over HTTP.

A paper entitled "Internet X.509 Public Key Infrastructure Certificate Management Protocol (CMP)" by C. Adams et al., Network Working Group, September 2005, describes an Internet standards track protocol for the Internet community, and requests discussion and suggestions for improvements.

A paper entitled "Certificate Management over CMS (CMC)" by J. Schaad et al., Network Working Group, June 2008, defines the base syntax for CMC, a Certificate Management protocol using the Cryptographic Message Syntax (CMS).

SUMMARY

An exemplary embodiment of the present disclosure provides a system for issuing a certificate to permit access to information, the system including: a memory storing a directory that includes identity data, biometric data, and contextual data regarding subscribers; an identification service processor module configured to receive dynamic biometric data and dynamic contextual data regarding an individual when that individual is located within an area, and to receive from the memory at least one of stored identity data, biometric data and contextual data for a given individual so as to provide an identity estimate and a level of certainty indicator of an identity match based on a comparison of the dynamic biometric data and the dynamic contextual data regarding the individual to the stored biometric data and the stored contextual data regarding the subscribers; a registration authority processor module configured to receive the identity estimate and the level of certainty indicator from the identification service processor module, and to determine whether a certificate should be issued to an individual based on the level of certainty indicator; and a certificate authority processor module configured to issue the certificate to a computing device when it is determined that the certificate should be issued, wherein the certificate will allow an individual to use the computing device to access an information system.

An exemplary embodiment of the present disclosure provides a method for issuing a certificate to permit access to information, including: storing identity data, biometric data, and contextual data regarding subscribers in a directory of a memory; receiving, in an identification service processor module, dynamic biometric data and dynamic contextual data regarding an individual when that individual is located within an area; receiving, in the identification service processor module, at least one of stored identity data, biometric data, and contextual data for a given individual from the memory; determining, by the identification service processor module, an identity estimate and a level of certainty indicator of an identity match based on a comparison of the dynamic biometric data and the dynamic contextual data regarding the individual to the stored biometric data and the stored contextual data regarding the subscribers; determining that a certificate should be issued to the individual based on the level of certainty indicator; and issuing the certificate to a computing device to allow the individual to use the computing device to access an information system.

BRIEF DESCRIPTION OF THE DRAWINGS

The scope of the present disclosure is best understood from the following detailed description of exemplary embodiments when read in conjunction with the accompanying drawings, wherein.

DETAILED DESCRIPTION

The present disclosure is directed to a system 100 for issuing a certificate (e.g., a digital certificate such as a X.509 certificate) to permit access to information. The system of the present disclosure removes the need for hardware tokens, and instead enrolls new credentials by validating an individual's identity through a trusted identification service of an identification service processor module, a location service of a location service processor module, and a combination of contextual and biometric sensors. Enrollment of these credentials occurs without user participation and occurs right before the user engages a computing device (e.g., a workstation) within an area (e.g., a campus environment). Also, the computing device does not need its own biometric or contextual sensing devices.

Figure 1:
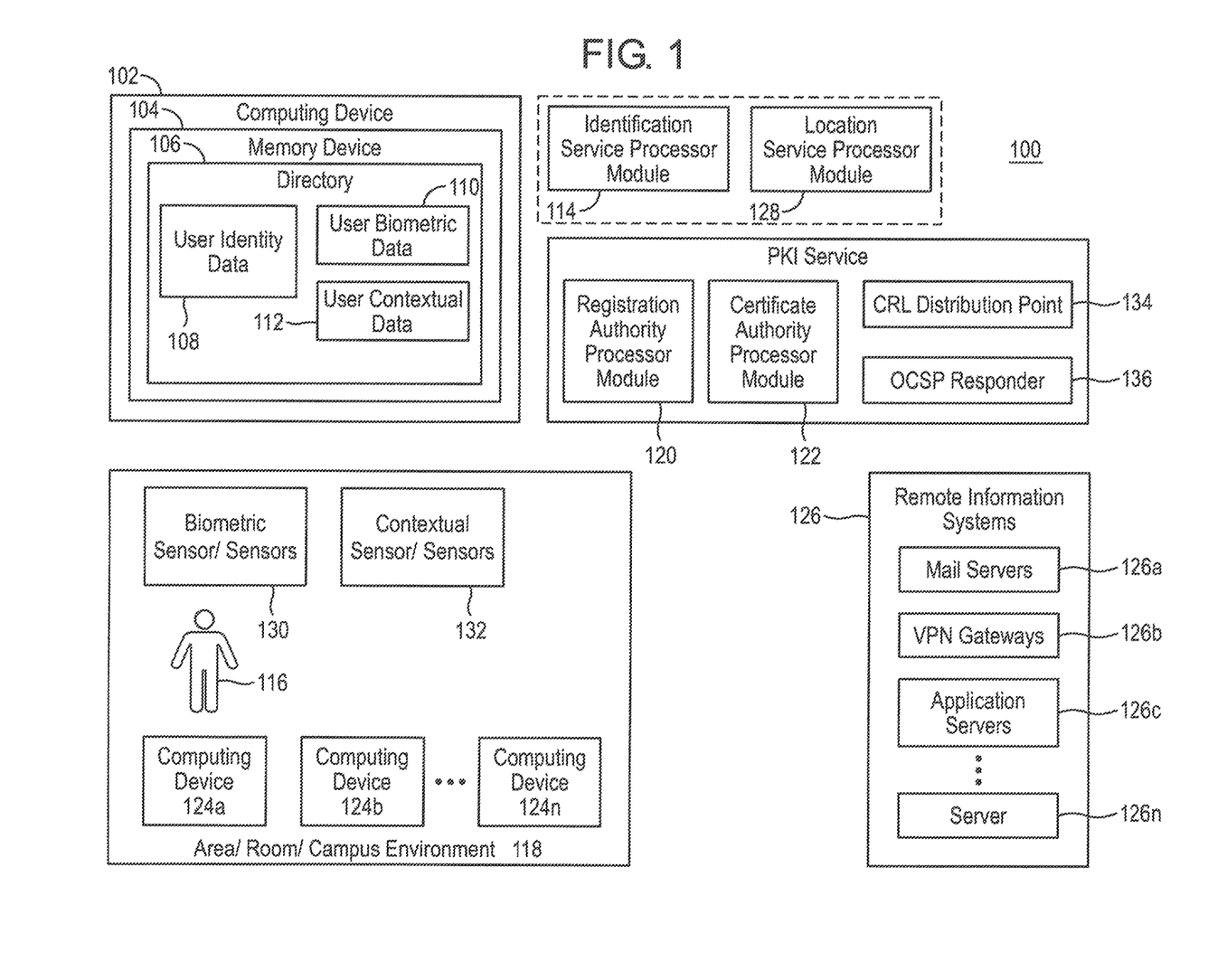
FIG. 1 is a block diagram illustrating a system hardware architecture in accordance with an exemplary embodiment.

In a non-limiting embodiment, FIG. 1 shows a system 100 for issuing a certificate to permit access to information. The system 100 includes a memory device 104 storing a directory 106 that includes identity data 108, biometric data 110, and contextual data 112 regarding subscribers (e.g., individuals, users). The memory device 104 is part of a computing device 102 such as a server, personal computer, laptop, tablet, etc. The memory device 104 can be, for example, a hard disk drive, a RAM, a ROM, a solid state drive, etc. The directory 106 includes identity information for subscribers within an enterprise (e.g., a company, organization, team, etc.). The identity information in the directory 106 can include, for example, names, passwords, phone numbers, email addresses, physical addresses (e.g., home address, work address, etc.), etc. for the subscribers.

The system 100 also includes an identification service processor module 114 that is configured to receive dynamic biometric data and dynamic contextual data regarding an individual 116 when that individual 116 is located within an area 118 (e.g., room, campus environment, etc.). The dynamic biometric data is dynamic in that the biometric data of the individual 116 can be captured periodically, intermittently, or continuously, and sent to the identification service processor module 114 periodically intermittently, or continuously. Similarly, the dynamic contextual data is dynamic in that the contextual data of the individual 116 can be captured periodically, intermittently, or continuously, and sent to the identification service processor module 114 periodically intermittently, or continuously. For example, the dynamic contextual data can indicate the various physical locations of the individual within the area 118. The identification service processor module 114 is configured to receive (from the memory device 104 of the computing device 102) at least one of stored identity data 108, stored biometric data 110 and stored contextual data 112 for a given individual 116 so as to provide an identity estimate and a level of certainty indicator of an identity match based on a comparison of the dynamic biometric data and the dynamic contextual data regarding the individual 116 to the stored biometric data 110 and the stored contextual data 112 regarding the subscribers.

The location service processor module 128 passes dynamic biometric data 110 and dynamic contextual data 112 for a given individual to the identification service processor module 114 that compiles data from the entire sensor network to estimate the identity of all individuals 116 within the coverage area 118. The identification service processor module 114 compares dynamic biometric and dynamic contextual data sets provided by the network of sensors to the data sets recorded in the directory 106. The identification service processor module 114 maintains a running numeric representation of its certainty that a monitored individual corresponds to a given identity stored in the directory 106. For example, the running numeric representation for certainty can be represented as a number from 1-100, 1-50, 1-20, 1-10, or any other number range.

The system 100 also includes a registration authority processor module 120 configured to receive the identity estimate and the level of certainty indicator from the identification service processor module 114, and to determine whether a certificate 202 should be issued to an individual 116 based on the level of certainty indicator. The system 100 also includes a certificate authority processor module 122 configured to issue the certificate 202 to a computing device 124 when it is determined that the certificate 202 should be issued. The certificate 202 will allow an individual 116 to use the computing device 124 to access an information system 126. As seen in FIG. 1, in a non-limiting embodiment, the registration authority processor module 120 and the certificate authority processor module 122 are part of a Public Key Infrastructure (PKI) service. A Certificate Revocation List (CRL) distribution point 134 and an Online Certificate Status Protocol (OCSP) responder 136 can also be part of the PKI service. A CRL distribution point is an interface representing a distribution point. The OCSP responder 136 may return a signed response signifying that a certificate specified in a request is "good," "revoked," or "unknown."

Figure 2:
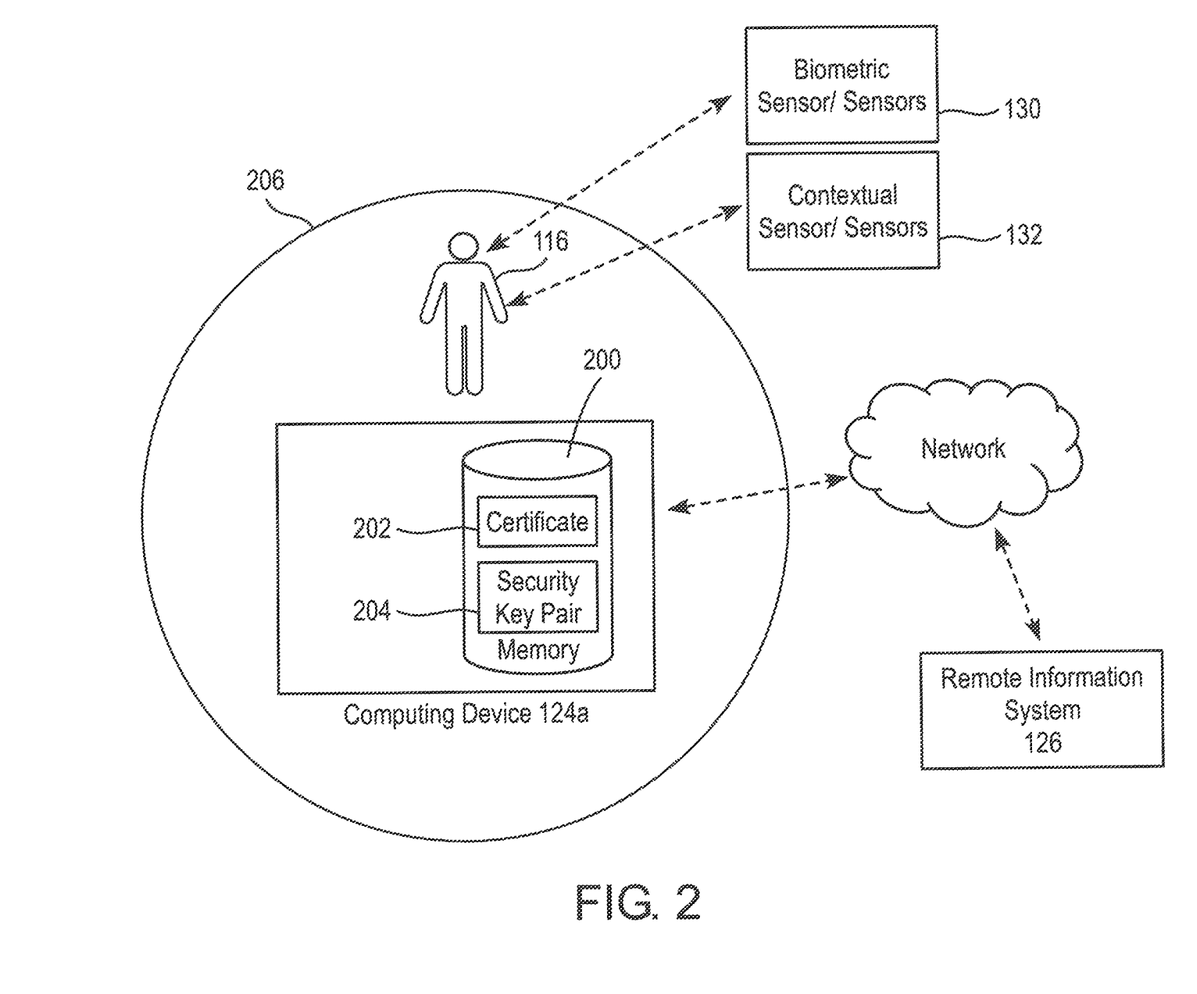
FIG. 2 is a block diagram illustrating a system hardware architecture in accordance with an exemplary embodiment.

In an exemplary embodiment, the system 100 includes one or more computing devices 124a, 124b, . . . , 124n that are located with a particular area 118 (e.g., room, portion of a room, building, campus, etc.). The area 118 can be a predefined area. As seen in FIG. 2, the computing device 124 (e.g., computing device 124a) can include a security key pair 204 stored in a memory device 200 to allow an individual 116 to access an information system 126 (e.g., an information system that is remote (i.e., external) from the computing device 124) upon receipt of the certificate 202 for that individual 116. As seen in FIG. 1, examples of remote information systems 126 are mail servers 126a, VPN gateways 126b, application servers 126c, any other servers 126n, etc. The memory device 200 can be, for example, a hard disk drive, a RAM, a ROM, a solid state drive, etc.

The system 100 also includes a location service processor module 128 configured to receive a notification indicating presence of an individual 116 within the area 118. The location service processor module 128 is configured to receive the dynamic biometric data and the dynamic contextual data regarding an individual 116 from at least one sensor 130, 132, and to determine when that individual 116 is within a predetermined distance 206 of the computing device 124. FIG. 2 shows that the individual 116 is located within the predetermined distance 206 of the computing device 124a. The computing device 124a can communicate with a remote information system 126 via a network. In an exemplary embodiment, the predetermined distance 206 is 1 to 2 feet. The predetermined distance can also be 1 to 5 feet. The predetermined distance can be any distance at which it is appropriate to operate the computing device 124. In an exemplary embodiment, the location service processor module 128 and the location service processor module can be part of the same processor device (e.g., CPU) or located in separate processor devices. Similarly, the registration authority processor module 120 and the certificate authority processor module 122 can be part of the same processor device or located in separate processor devices.

The sensor network feeds data to the location service processor module 128, and the location service processor module 128 detects when an individual 116 has entered the coverage area of the sensor network. The location service processor module 128 digitally records that the individual 116 is present in the coverage area 118, and monitors and digitally records the movement of the individual 116 throughout the area 118. In an exemplary embodiment, the location service processor module 128 alerts other elements of the system when the individual 116 enters or departs areas of interest, for example within the predetermined distance of a computing device 124. For example, the location service processor module 128 can alert the registration authority processor module 120 and the certificate authority processor module 122 when the individual 116 enters or departs areas of interest.

In an exemplary embodiment, the system 100 includes one or more sensors in the sensor network (e.g., contextual sensor or sensors 132 and/or biometric sensor or sensors 130) configured to detect presence and location of an individual 116. The biometric data can be one or more sets of data that represent an information system's ability to sense the individual 116 by the one or more sensors (e.g., one or more biometric sensors 130 and/or one or more contextual sensors 132). The biometric data sets can be, for example, facial recognition data, fingerprint data, voice recognition data, etc. Contextual data can be one or more sets of data that represent the state of the individual 116 or the environment around the individual 116. The contextual data sets can be, for example, the location the individual 116 is currently at, the time the individual 116 is there, where the individual 116 has been previously, whether any other indicators show the individual 116 in another location, what wireless devices are in the vicinity of the individual 116, etc.

The one or more biometric sensors 130 and the one or more contextual sensors 132 form the sensor network. The sensors 130, 132 can include, for example, cameras for facial recognition, optical sensors for location or movement tracking, microphones for gait or voice recognition, fingerprint readers, and radio frequency (RF) monitors. These sensors provide coverage of the entire area in which the computing devices 124 (e.g., client devices) are intended to operate with biometrically and contextually registered credentials. The selection of sensor types can be tailored to the deployment, but the set of sensors used can be able to identify an individual's position within 1-2 feet (or any other distance less than 5 feet) of a computing device 124 in order to determine whether the individual 116 is attempting to engage the computing device 124. In an exemplary embodiment, the contextual sensors 132 can be, for example, multiple optical sensors with machine vision and object triangulation capabilities. Other sensors with these capabilities can also be used. The devices shown in FIG. 1 can communicate with each other over a network.

In an exemplary embodiment, the location service processor module 128 is configured to notify the registration authority processor module 120 when an individual 116 is determined to be within the predetermined distance 206 of the computing device 124 by one or more of the sensors 130, 132.

In an exemplary embodiment, the location service processor module 128 is configured to create a record of movement of an individual 116 about the area 118 over time. For example, the amount of time can be from when the individual 116 enters the area 118 to when the individual 116 leaves the area. The record of movement of the individual 116 and other individuals can be stored in a memory device of the location service processor module 128 or in a memory device external to the location service processor module 128.

In an exemplary embodiment, the registration authority processor module 120 is configured to query the identification service processor module 114 for the identity estimate of an individual 116 and the level of certainty indicator when the location service processor module 128 has determined that individual 116 to be within the predetermined distance 206 of the computing device 124.

In an exemplary embodiment, the registration authority processor module 120 is configured to receive information that indicates when an individual 116 has moved away from the computing device 124 or has disengaged from the computing device 124, and to use the information to decide whether to revoke the certificate 202 when the registration authority processor module 120 has determined that the individual 116 has moved away from the computing device 124 or has disengaged from the computing device 124. The information that indicates when an individual 116 has moved away from the computing device 124 or has disengaged from the computing device 124 is produced based on detections by the sensor network.

In an exemplary embodiment, the identification service processor module 114 is configured to receive the dynamic biometric data and the dynamic contextual data regarding an individual 116 from the location service processor module 128. The identification service processor module 114 is configured to receive the stored biometric data 110 and the stored contextual data 112 regarding subscribers from the directory 106. However, the identification service processor module 114 can receive the dynamic biometric data and the dynamic contextual data regarding an individual 116 from a device intermediate to the location service processor module 128 (i.e., indirectly from the location service processor module 128). The identification service processor module 114 can receive the stored biometric data 110 and the stored contextual data 112 regarding subscribers from a device intermediate to the directory 106 (i.e., indirectly from the directory 106).

The computing devices 124a, 124b, . . . , 124n are a fleet of workstations, mobile computing devices, or other client devices (e.g., desktop computers, laptop computers, tablets, smartphones, etc.) within the coverage area of the sensor network of the sensors 130, 132. The location of each computing device 124 is known to the location service processor module 128, either through manual configuration if it is in a fixed location, or through asset tracking via the sensor network if it is a mobile device. In an exemplary embodiment, through either manual configuration or monitoring through the sensor network, the physical locations of the computing devices 124 are known to the registration authority processor module 120 (functioning as a Registration Authority). The registration authority processor module 120 monitors the individuals 116 within the coverage area 118 relative to the computing devices 124 using the sensor network. Each computing device 124 is in possession of a trusted PKI credential asserting the identity of the computing device 124 which can be used to negotiate session keys with the registration authority processor module 120 for an authenticated and confidential communication tunnel. The tunnel is used to securely enroll user certificates with the registration authority processor module 120 and to attest to the location in which user keys are generated.

When an individual's 116 proximity to a computing device 124 is close enough to suggest that the individual 116 intends to operate a computing device 124 (for example is located within a predetermined distance of the computing device 124), the location service processor module 128 notifies the registration authority processor module 128 that a certificate enrollment may be required. The registration authority processor module 128 queries the identification service processor module 114 for the identity of the individual 116. The identification service processor module 114 returns the identity of the individual 116 along with a numeric representation of its certainty of the identity of the individual 116. The registration authority processor module 128 uses the certainty value to decide whether or not to issue a certificate to the individual 116, and optionally, whether to include a Policy Object Identifier (OID) to assert a level of confidence in the identity of the individual 116. If the registration authority processor module 120 decides to issue the certificate it can either generate the asymmetric key pair itself and direct a certificate authority processor module 122 to issue a certificate for it, or it can direct the computing device 124 to generate the key pair through a standard certificate management protocol and return a certificate signing request to the registration authority processor module 120 or the certificate authority processor module 122 to certify.

The certificate authority processor module 122 is the entity responsible for issuing client certificates within the PKI. Its operation is defined in a published Certificate Policy and Certificate Practice Statement. All relying parties within the PKI use the certificate authority processor module's certificate to validate client certificates issued under it. The certificate authority processor module 122 also provides Certificate Revocation Lists (CRL) to alert relying parties of certificates which are no longer trustworthy. New certificates are enrolled by submitting a Certificate Signing Request, which the certificate authority processor module 122 validates and responds with a signed certificate. Revocation of the certificate invalidates it for use when authenticating to remote systems 126. Alternatively, the computing device 124 can disable private key access until the authenticated individual returns to use the system 126.

In an exemplary embodiment, the identification service processor module 114 is configured to periodically update the identity estimate and the level of certainty indicator. For example, the update can happen at a fixed, predetermined time interval or can happen at varying time intervals.

In an exemplary embodiment, the identification service processor module 114 is configured to perform the comparison by using at least one of the dynamic biometric data and the dynamic contextual data as an index to the memory 104 for an indirect comparison, and to receive the other of the stored biometric data 110 and the stored contextual data 112 in response thereto for a direct comparison to the other of the dynamic biometric data and the dynamic contextual data. For example, the identification service processor module 114 can send the dynamic biometric data to the memory device 104 storing the directory 106, and the computing device 102 compares the received dynamic biometric data to the stored biometric data 110 entries. When there is a match of the biometric data, the computing device sends the stored contextual data 112 and the user identity 108 that corresponds to the stored biometric data that matches the dynamic biometric data back to the identification service processor module 114. Once the identification service processor module 114 has received the stored contextual data 112, it compares the stored contextual data 112 to the dynamic contextual data.

Also, the identification service processor module 114 can send the dynamic contextual data to the memory device 104 storing the directory 106, and the computing device 102 compares the received dynamic contextual data to the stored contextual data 112 entries. When there is a match of the contextual data, the computing device sends the stored biometric data 110 and the user identity 108 that corresponds to the stored contextual data 112 that matches the dynamic contextual data back to the identification service processor module 114. Once the identification service processor module 114 has received the stored biometric data 110, it compares the stored biometric data 110 to the dynamic biometric data. So, one check of the data is performed by the computing device 102, and one check of the data is performed by the identification service processor module 114.

In an exemplary embodiment, both checks can be performed by the computing device 102. For example, the identification service processor module 114 can send the dynamic contextual data and the dynamic biometric data to the memory device 104 storing the directory 106, and the computing device 102 compares the received dynamic contextual data to the stored contextual data 112 entries and the computing device 102 compares the received dynamic biometric data to the stored biometric data 110 entries. When there is a match of both the contextual data and the biometric data, the computing device sends the stored user identity 108 that corresponds to the matched contextual data 112 and the matched biometric data 110 back to the identification service processor module 114.

In an exemplary embodiment, both checks can be performed by the identification service processor module 114. The computing device 102 sends all or some of the data in the directory 106 to the identification service processor module 114. Once the identification service processor module 114 has received all or some of the data in the directory 106, it compares the dynamic biometric data and the dynamic contextual data to the received data from the directory 106 for matches.

In an exemplary embodiment, the identification service processor module 114 is configured to determine the level of certainty indicator by individually weighting each of the dynamic biometric data and the dynamic contextual data according to a respective reliability factor. In an exemplary embodiment, the level of certainty indicator is at least one number. However, the level of certainty indicator can be a letter, symbol, color, picture, etc.

The sensor network is deployed throughout the area 118 and continuously monitors for the presence of individuals within its coverage area. When an individual 116 enters the area 118, the sensor network detects the presence of the individual 116. This can be through visual detection, wherein a camera detects motion and uses computer vision to identify the moving object as a human, however audio and RF based sensors could also achieve this functionality. In a camera-based solution, the position of the individual 116 within the field of view of the camera provides the sensor 132 the angle component of a vector from the camera to the individual 116. When multiple cameras detect the same individual 116, the angles they detect for that individual 116 can be used to triangulate the location of the individual 116, creating the location data (e.g., coordinates, etc.) necessary to track their movement through the area 118.

When a new individual 116 has been detected in the area 118, the sensor network alerts the location service processor module 128 which creates a logical record of the individual's 116 presence and location. This record is continually updated with new location data provided by the sensor network. Location data are the coordinates of the individual 116 at a given time. The sensor network also provides biometric and contextual data which are associated with the logical record of the individual 116 in the location service processor module 128 and passed along to the identification service processor module 114. As more individuals 116 enter the area 118, the location service processor module 128 creates records for each new individual 116 detected by the sensor network and maintains a record of their location.

The identification service processor module 114 receives biometric and contextual data samples associated with an individual's logical record from the location service processor module 128. The identification service processor module 114 compares these samples to data recorded in the directory 106 of users (e.g., could be a directory of all employees of a corporation). These comparisons will provide a level of certainty that a given logical record of an individual 116 from the location service processor module 128 has an identity in the directory 106. For example, this level of certainty can be represented as a number from 1-100 (i.e., a running numeric), where the identification service processor module 114 will have a low level of certainty (e.g., 1-20) that an individual 116 is the incorrect identity, and a high level of certainty (e.g., 80-100) that an individual 116 is the correct Identity. This level of certainty increases or decreases with the analysis of new biometric and contextual data provided by the location service processor module 128. A simple algorithm for this aggregate certainty could be averaging the instantaneous certainty of each individual sample. For example, if the identification service processor module 114 has 10 samples of biometric and contextual data, 9 of them offer 90% certainty and 1 provides 20% certainty, the aggregate level of certainty is 83%. In practice though, biometric and contextual data types should be weighted according to their reliability. With sufficient biometric and contextual sensors 130, 132 deployed within the area 118, the identification service processor module 114 should receive enough data samples for a new individual entering the area 118 to isolate a single identity in the directory 106 with a high level of certainty prior to the individual reaching a computing device 124.

The location service processor module 128 has the coordinates of all computing devices 124 within the area 118. When the location service processor module 128 detects that an individual has moved within a critical distance of a computing device 124, typically 1-2 feet, it alerts the registration authority processor module 120 that a certificate enrollment may need to occur on that computing device 124. The registration authority processor module 120 queries the identification service processor module 114 for the identity estimate of the individual 116 at that location. The identification service processor module 114 returns a list of one or more identity estimates with their associated levels of certainty. The registration authority processor module 120 is responsible for determining whether a certificate should be issued based on this information. The registration authority processor module 120 does this by determining whether the level of certainty of the most likely estimate (i.e., the one with the highest level of certainty) is greater than a predefined level (e.g., greater than 80), and whether the most likely estimate is greater than the second most likely estimate by at least a predefined quantity (e.g., the most likely estimate must be 50 points more likely than the second most likely). If the most likely identity estimate meets these criteria, the registration authority processor module 120 initiates the certificate issuance procedure. If not, the registration authority processor module 120 can optionally initiate an alternative or supplementary identity vetting procedure, such as directing the individual 116 to submit an additional biometric sample (e.g., a fingerprint) or electronically authenticate with a hardware token, directly on the computing device 124 to further improve the identity estimate. If the additional identity information is sufficient to raise the identity estimate to meet the criteria, the registration authority processor module 120 can initiate the certificate issuance procedure.

Issuance of new certificates can occur through several different protocols, e.g., standards-based protocols such as Certificate Management Protocol (CMP) or Enrollment over Secure Transport (EST) which are preferred for interoperability considerations. Using these protocols, the certificate authority processor module 122 can enroll a new certificate through either a centralized key generation model or a distributed key generation model. In a centralized model, the certificate authority processor module 122 generates the key pair for the credential locally, issues a certificate for it, and sends the certificate and private key (both encrypted) to the computing device 124. In a distributed model, the certificate authority processor module 122 directs the computing device 124 to generate the key pair and return a certificate signing request which the certificate authority processor module 122 uses to generate a certificate to return to the computing device 124.

Once the computing device 124 has received the certificate asserting the identity of the individual 116 from the certificate authority processor module 122, the individual 116 is able to use the credential on the computing device 124 to authenticate to local and remote information systems that trust the certificate authority processor module 122. In an exemplary embodiment, hardware tokens or passwords can be layered on top of biometric and contextual data as an added data set.

FIGS. 3A-3D are a detailed flow chart of the steps performed by the components of the system 100, the broader flow diagram of FIG. 4 will be discussed first. FIG. 4 illustrates an exemplary method for issuing a certificate 202 to permit access to information. The method includes storing identity data 108, biometric data 110, and contextual data 112 regarding subscribers in a directory 106 of a memory 104 (step S400). The method includes receiving, in an identification service processor module 114, dynamic biometric data and dynamic contextual data regarding an individual 116 when that individual is located within an area 118 (step S402). The method includes receiving, in the identification service processor module 114, at least one of stored identity data 108, biometric data 110, and contextual data 112 for a given individual from the memory 104 (step S404). The method also includes determining, by the identification service processor module 114, an identity estimate and a level of certainty indicator of an identity match based on a comparison of the dynamic biometric data and the dynamic contextual data regarding the individual to the stored biometric data 110 and the stored contextual data 112 regarding the subscribers (step S406). The method also includes determining that a certificate 202 should be issued to the individual 116 based on the level of certainty indicator (step S408). The method further includes issuing the certificate 202 to a computing device 124 to allow the individual to use the computing device 124 to access an information system 126 (step S410).

In an exemplary embodiment, the method can include storing a security key pair 204 in a memory 200 of the computing device 124; and using the certificate 202 and the security key pair 204 to access the information system 126.

In an exemplary embodiment, the method can include receiving, in a location service processor module 128, a notification indicating presence of the individual 116 within the area 118. It also can include receiving, in the location service processor module 128, the dynamic biometric data and the dynamic contextual data regarding the individual 116 from at least one sensor 130, 132; and determining, by the location service processor module 128, that the individual 116 is within a predetermined distance 206 of the computing device 124.

In an exemplary embodiment, the method can include sending, by the location service processor module 128, a notification to a registration authority processor module 120 after the individual 116 is determined to be within the predetermined distance 206 of the computing device 124.

In an exemplary embodiment, the method can include creating, by the location service processor module 128, a record of movement of the individual 116 about the area 118 over time.

In an exemplary embodiment, the method can include querying, by a registration authority processor module 120, the identification service processor module 114 for the identity estimate of the individual 116 and the level of certainty indicator when the location service processor module 128 has determined that the individual 116 is within the predetermined distance 206 of the computing device 124.

In an exemplary embodiment, the method can include receiving, in a registration authority processor module 120, information that indicates that the individual 116 has moved away from the computing device 124 or has disengaged from the computing device 124. It can also include deciding, by the registration authority processor module 120, whether to revoke the certificate 202 when the registration authority processor module 120 has determined from the information that the individual 116 has moved away from the computing device 124 or has disengaged from the computing device 124.

In an exemplary embodiment, the method can include detecting, with one or more sensors 130, 132, presence and location of the individual 116. The dynamic biometric data and the dynamic contextual data regarding the individual that is received by the identification service processor module 114 can be sent by the location service processor module 128.

In an exemplary embodiment, the method can include periodically updating, by the identification service processor module 114, the identity estimate and the level of certainty indicator. The comparing by the identification service processor module 114 includes using at least one of the dynamic biometric data and the dynamic contextual data as an index to the memory 104 for an indirect comparison. The method can also include receiving the other of the stored biometric data 110 and the stored contextual data 112 in response thereto for a direct comparison to the other of the dynamic biometric data and the dynamic contextual data. The determining of the level of certainty indicator by the identification service processor module 114 is performed by individually weighting each of the dynamic biometric data and the dynamic contextual data according to a respective reliability factor. The level of certainty indicator can be at least one number.

Figure 3A:
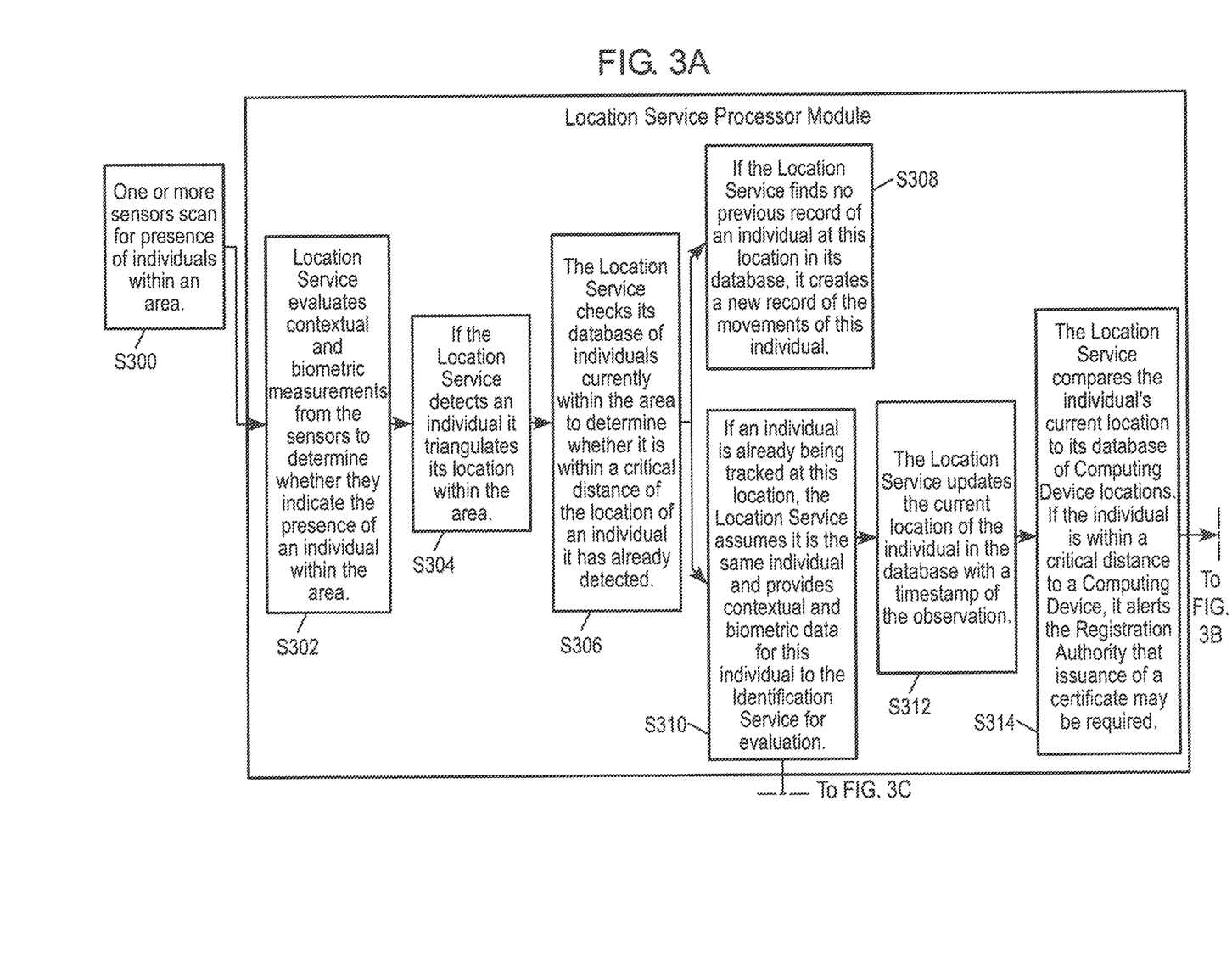
FIGS. 3A-3D are a flow chart illustrating a method according to an exemplary embodiment.
Figure 3B:
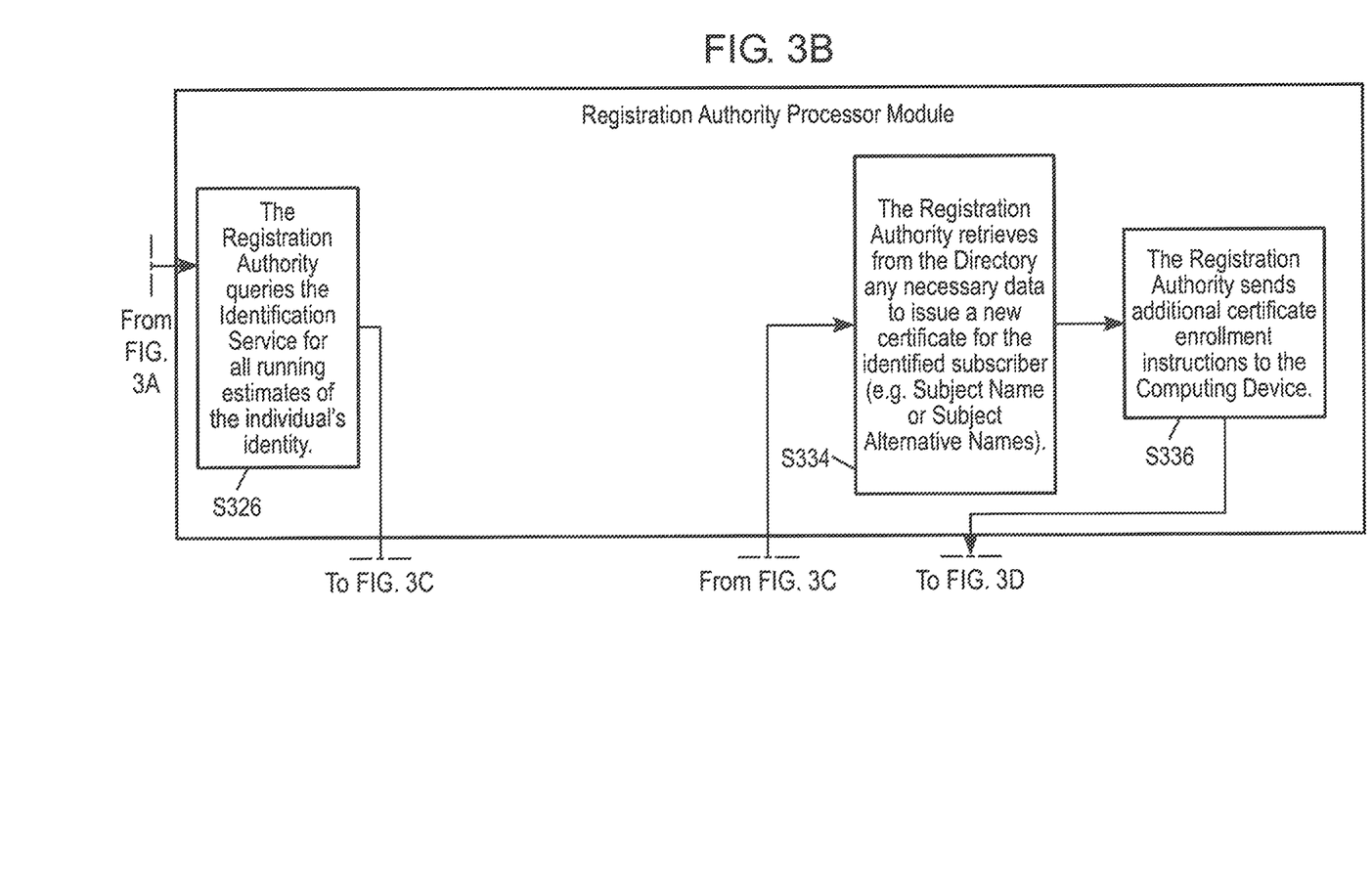

FIGS. 3A-3D are a flow chart illustrating a method according to an exemplary embodiment. In FIG. 3A, in step S300, one or more sensors 130, 132 scan for presence of individuals 116 within an area 118. In step S302, the location service processor module 128 evaluates contextual and biometric measurements from the biometric sensors 130 and the contextual sensors 132 to determine whether they indicate the presence of an individual 116 within the area 118. In step S304, if the location service processor module 128 detects an individual 116, it triangulates its location with the area 118.

In step S306, the location service processor module 128 checks its database of individuals currently located within the area 118 to determine whether the detected location is within a critical distance of the location of an individual 116 it has already detected. If the location service processor module 128 finds no previous record of an individual at this location in its database, the location service processor module 128 creates a new record of the movements of this individual (step S308). If the location service processor module 128 determines that an individual is already being tracked at this location, the location service processor module 128 assumes it is the same individual and provides contextual and biometric data for this individual to the identification service processor module 114 for evaluation (step S310).

Figure 3C:
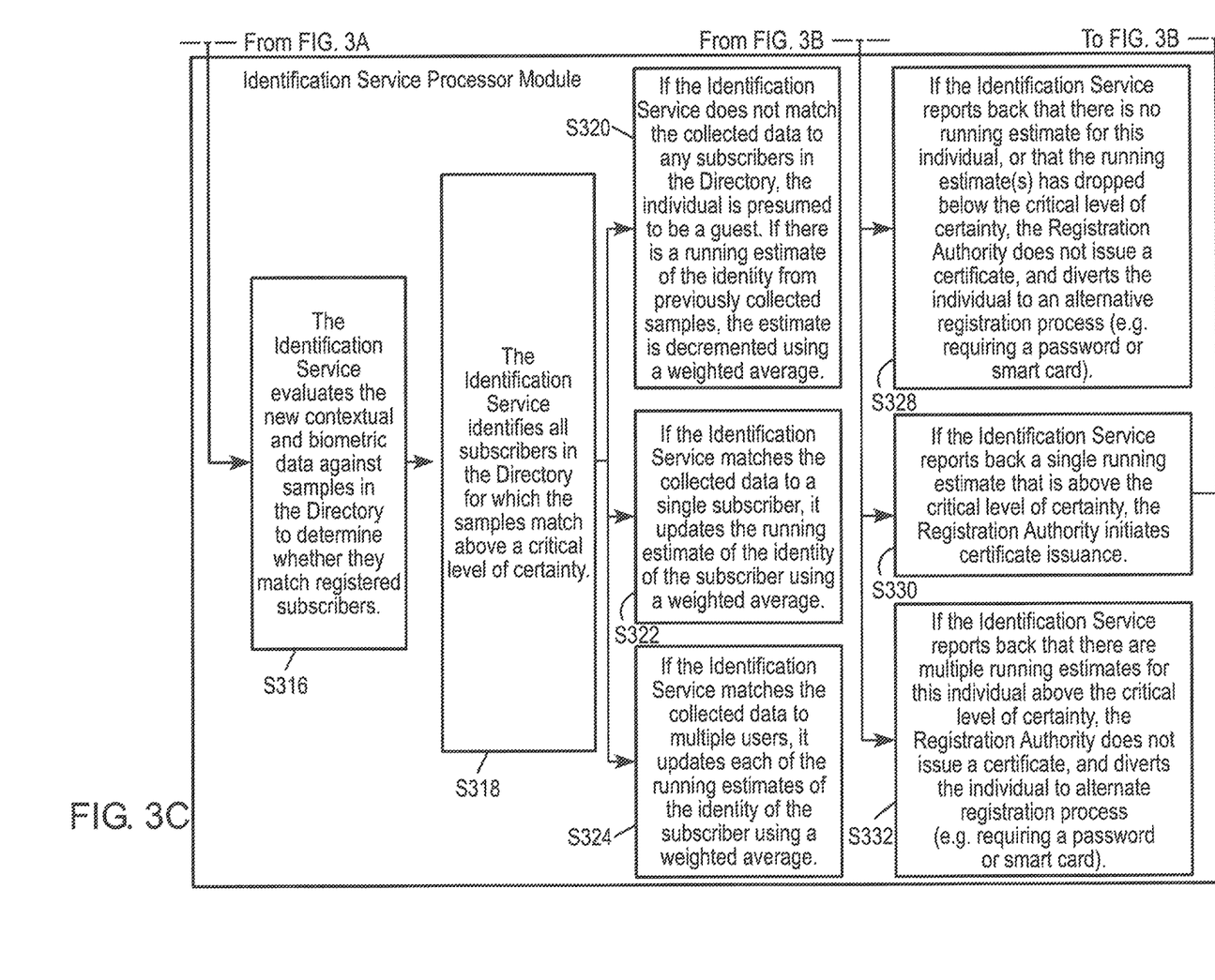
Figure 4:
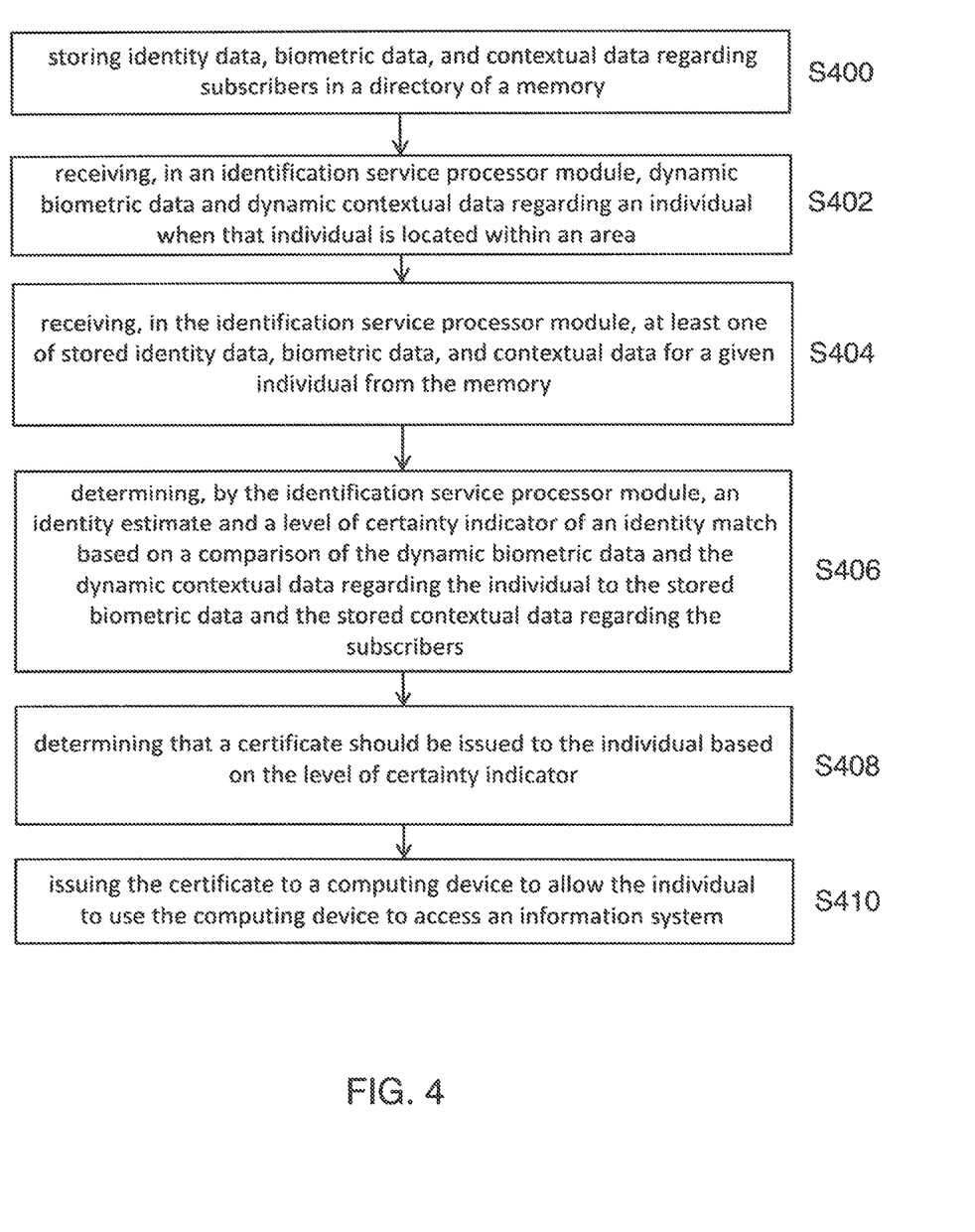
FIG. 4 is a flow chart illustrating a method according to an exemplary embodiment.

After step S310, the method continues to step S316 in FIG. 3C, which is performed by the identification service processor module 114 or to step S312 in FIG. 3A. In step S316, the identification service processor module 114 evaluates the new contextual and biometric data against samples in the directory 106 to determine whether they match registered subscribers. In step S318, the identification service processor module 114 identifies all subscribers in the directory 106 for which the samples match above a critical level of certainty. Next, in step S320, if the identification service processor module 114 does not match the collected data to any subscribers in the directory 106, the individual 116 is presumed to be a guest. If there is a running estimate of the identity from previously collected samples, the estimate is decremented using a weighted average. After step S318, in step S322, if the identification service processor module 114 matches the collected data to a single subscriber, it updates the running estimate of the identity of the subscriber using a weighted average. After step S318, in step S324, if the identification service processor module 114 matches the collected data to multiple users, it updates each of the running estimates of the identity of the subscriber using a weighted average.

In FIG. 3A, in step S312, the location service processor module 128 updates the current location of the individual 116 in its database with a timestamp of the observation. In step S314, the location service processor module 128 compares the individual's current location to its database of computing device locations. If the individual 116 is within a predetermined distance to a computing device 124, it alerts the registration authority processor module 120 that issuance of a certificate may be required. Next, in step S326 of FIG. 3B, the registration authority processor module 120 queries the identification service processor module 114 for all running estimates of the individual's identity. Next, the flow chart proceeds to FIG. 3C to step S328, S330, or S332.

In step S328, if the identification service processor module 114 reports back that there is no running estimate for this individual 116, or that the running estimate(s) has dropped below the critical level of certainty, the registration authority processor module 120 does not issue a certificate, and diverts the individual 116 to an alternative registration process (e.g., requiring a password, smart card, etc.) In step S332, if the identification service processor module 114 reports back that there are multiple running estimates for this individual 116 above the critical level of certainty, the registration authority processor module 120 does not issue a certificate, and diverts the individual 116 to an alternate registration process (e.g., requiring a password, smart card, etc.). In step S330, if the identification service processor module 114 reports back to a single running estimate that is above the critical level of certainty, the registration authority processor module 120 initiates issuance of the certificate.

After step S330, the process proceeds to step S334 of FIG. 3B. In step S334, the registration authority processor module 120 retrieves from the directory 106 any necessary data to issue a new certificate for the identified subscriber (e.g., subject distinguished name or subject alternative names). Next, in step S336, the registration authority processor module 120 sends additional certificate enrollment instruction to the computing device 124. After step, S336, the process proceeds to step S338 of FIG. 3D.

Figure 3D:
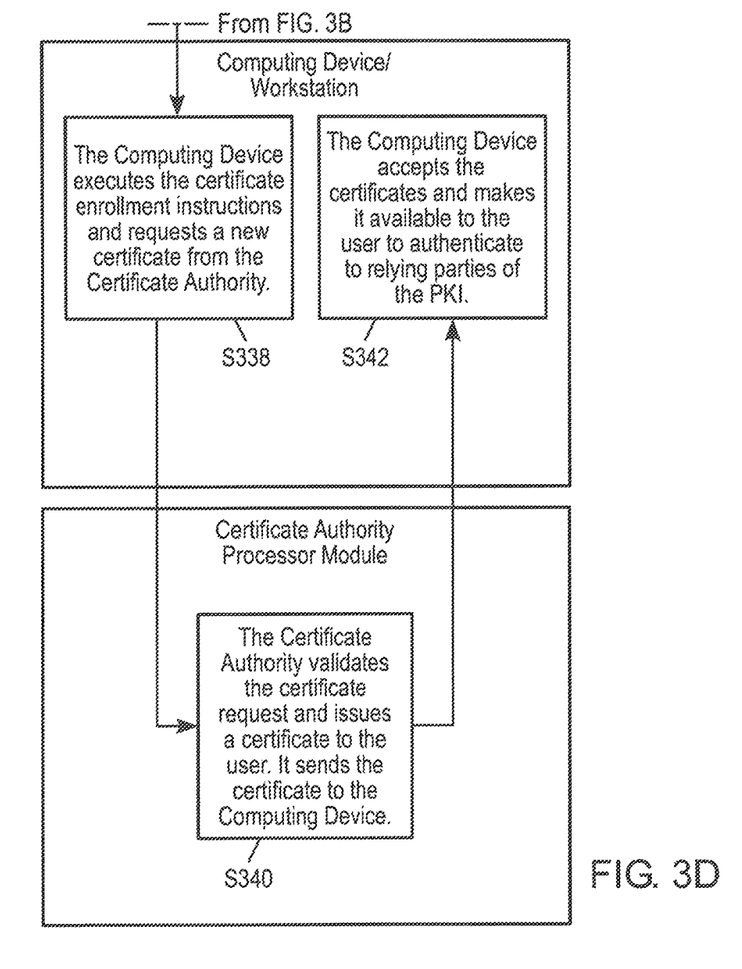

In step S338, the computing device 124 executes the certificate enrollment instructions and requests a new certificate from the certificate authority processor module 122. Next, in step S340, the certificate authority processor module 122 validates the certificate request and issues a certificate to the individual 116. The certificate authority processor module 122 sends the certificate to the computing device 124. Next, in step S342, the computing device 124 accepts the certificate and makes it available to the user (i.e. the individual 116) to authenticate to relying parties of the PKI.

Figure 5:
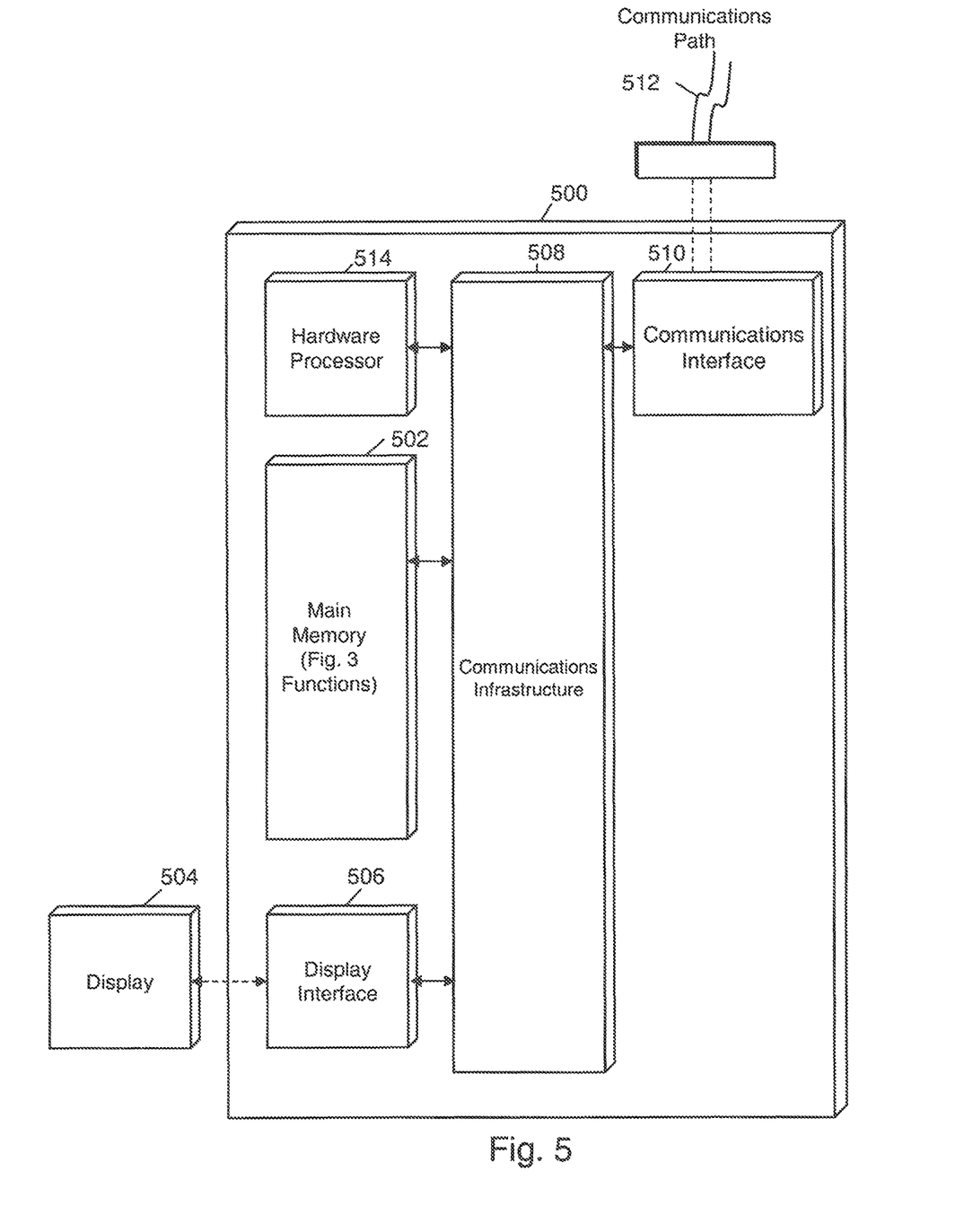
FIG. 5 illustrates a hardware architecture of a processor module in accordance with an exemplary embodiment.

FIG. 5 is a block diagram illustrating an architecture in accordance with an exemplary embodiment that can be used as a processor module architecture 500, i.e. for the identification service processor module 114, location service processor module 128, registration authority processor module 120, and certificate authority processor module 122 in FIG. 1. A similar computing device architecture could be used for the computing device 102 and computing devices 124a, 124b, ... 124n. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A hardware processor device as discussed herein may be a single hardware processor, a plurality of hardware processors, or combinations thereof. Hardware processor devices may have one or more processor "cores." The term "non-transitory computer readable medium" as discussed herein is used to generally refer to tangible media such as a memory device 502.

Various embodiments of the present disclosure are described in terms of this exemplary computing device 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Hardware processor 514 may be a special purpose or a general purpose processor device. The hardware processor device 514 may be connected to a communications infrastructure 508, such as a bus, message queue, network, multi-core message-passing scheme, etc. The network shown in FIGS. 1 and 2 may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The computing device 500 may also include a memory 502 (e.g., random access memory, read-only memory, etc.), and may also include one or more additional memories. The memory 502 and the one or more additional memories may be read from and/or written to in a well-known manner. In an embodiment, the memory 502 and the one or more additional memories may be non-transitory computer readable recording media.

Data stored in the computing device 500 (e.g., in the memory 502) may be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory 502.

In an exemplary embodiment, the data may be configured in any type of suitable database configuration, such as a relational database, a structured query language (SQL) database, a distributed database, an object database, etc. Suitable configurations and storage types will be apparent to persons having skill in the relevant art.

The computing device 500 may also include a communications interface 510. The communications interface 510 may be configured to allow software and data to be transferred between the computing device 500 and external devices. Exemplary communications interfaces 510 may include a modem, a network interface (e.g., an Ethernet card), a communications port, a PCMCIA slot and card, etc. Software and data transferred via the communications interface 510 may be in the form of signals, which may be electronic, electromagnetic, optical, or other signals as will be apparent to persons having skill in the relevant art. The signals may travel via a communications path 512, which may be configured to carry the signals and may be implemented using wire, cable, fiber optics, a phone line, a cellular phone link, a radio frequency link, etc.

Memory semiconductors (e.g., DRAMs, etc.) may be means for providing software to the computing device 500. Computer programs (e.g., computer control logic) may be stored in the memory 502. Computer programs may also be received via the communications interface 510. Such computer programs, when executed, may enable computing device 500 to implement the present methods as discussed herein. In particular, the computer programs stored on a non-transitory computer-readable medium, when executed, may enable hardware processor device 502 to implement the methods illustrated by FIGS. 3A, 3B, 3C, 3D, and 4, or similar methods, as discussed herein. Accordingly, such computer programs may represent controllers of the computing device 500. Where the present disclosure is implemented using software, the software may be stored in a computer program product or non-transitory computer readable medium and loaded into the computing device 500 using a removable storage drive or communications interface 510.

The computing device 500 may also include a display interface 506 that outputs display signals to a display unit 504, e.g., LCD screen, plasma screen, LED screen, DLP screen, CRT screen, etc.

Where the present disclosure is implemented using software, the software may be stored in a computer program product or non-transitory computer readable medium and loaded into one or more of the identification service processor module 114, the location service processor module 128, the registration authority processor module 120, and the certificate authority processor module 122 using a removable storage drive or a communications interface.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for issuing a certificate to permit access to information, the system comprising:
   a memory storing a directory that includes biometric data, and contextual data regarding subscribers;
   an identification service processor module configured to receive dynamic biometric data and dynamic contextual data regarding an individual when that individual is located within an area, and to receive from the memory at least one of stored biometric data or contextual data for the individual so as to provide an identity estimate and a level of certainty indicator of an identity match based on a comparison of the dynamic biometric data and the dynamic contextual data regarding the individual to the stored biometric data and the stored contextual data regarding the subscribers,
   a registration authority processor module configured to receive the identity estimate and the level of certainty indicator from the identification service processor module, and to determine that a certificate should be issued to the individual when a level of certainty indicator of a first identity estimate is greater than a predefined level, and the first identity estimate is greater than a second identity estimate by a specific value, prior to the individual reaching a computing device; and
   a certificate authority processor module configured to issue the certificate to the computing device when it is determined that the certificate should be issued, wherein the certificate will allow the individual to use the computing device to access an information system.

2. The system of claim 1, in combination with a computing device, wherein the computing device comprises:
   a security key pair stored in a memory to allow an individual to access an information system upon receipt of the certificate for that individual.

3. The system of claim 1, comprising:
   a location service processor module configured to receive a notification indicating presence of an individual within the area, the location service processor module being configured to receive the dynamic biometric data and the dynamic contextual data regarding an individual from at least one sensor, and to determine when that individual is within a predetermined distance of the computing device.

4. The system of claim 3, wherein the location service processor module is configured to notify the registration authority processor module when an individual is determined to be within the predetermined distance of the computing device.

5. The system of claim 3, wherein the location service processor module is configured to create a record of movement of an individual about the area over time.

6. The system of claim 5, wherein the record of movement of the individual includes information regarding one or more guests that accompany the individual in the area.

7. The system of claim 3, wherein the registration authority processor module is configured to query the identification service processor module for the identity estimate of an individual and the level of certainty indicator when the location service processor module has determined that individual to be within the predetermined distance of the computing device.

8. The system of claim 3, wherein the identification service processor module is configured to receive the dynamic biometric data and the dynamic contextual data regarding an individual from the location service processor module, and the identification service processor module is configured to receive the stored biometric data and the stored contextual data regarding subscribers from the directory.

9. The system of claim 3, wherein the predetermined distance is 1 to 2 feet.

10. The system of claim 1, wherein the registration authority processor module is configured to receive information that indicates when an individual has moved away from the computing device or has disengaged from the computing device, and to use the information to decide whether to revoke the certificate when the registration authority processor module has determined that individual to have moved away from the computing device or to have disengaged from the computing device.

11. The system of claim 1, comprising:
    one or more sensors configured to detect presence and location of an individual.

12. The system of claim 1, wherein the identification service processor module is configured to periodically update the identity estimate and the level of certainty indicator.

13. The system of claim 1, wherein the identification service processor module is configured to perform the comparison by using at least one of the dynamic biometric data, or the dynamic contextual data as an index to the memory for an indirect comparison, and to receive the other of the stored biometric data and the stored contextual data in response thereto for a direct comparison to the other of the dynamic biometric data and the dynamic contextual data.

14. The system of claim 1, wherein the level of certainty indicator is at least one number.

15. The system of claim 1, wherein the first identity estimate is identified to be one of the identity estimate with a highest level of certainty indicator, and the second identity estimate is identified to be one of the identity estimate with a second highest level of certainty indicator.

16. The system of claim 1, wherein
the level of certainty indicator is determined by weighting each type of the dynamic contextual data and the dynamic biometric data according to a respective reliability factor, and
the dynamic contextual data and the dynamic biometric data include multiple types of data.

17. A method for issuing a certificate to permit access to a computing device, comprising:
storing biometric data and contextual data regarding subscribers in a memory;
receiving dynamic biometric data and dynamic contextual data of an individual when the individual is located within an area;
receiving at least one of stored biometric data, or contextual data for the individual from the memory;
determining an identity estimate and a level of certainty indicator of an identity match based on a comparison of the dynamic biometric data and the dynamic contextual data with the stored biometric data and the stored contextual data; and
issuing the certificate to the individual when a level of certainty indicator of a first identity estimate is greater than a predefined level, and the first identity estimate is greater than a second identity estimate by a specific value, prior to the individual reaching the computing device.

18. The method of claim 17, comprising:
storing a security key pair in a memory of the computing device; and
using the certificate and the security key pair to access the information system.

19. The method of claim 17, comprising:
receiving a notification indicating presence of the individual within the area;
receiving the dynamic biometric data and the dynamic contextual data regarding the individual from at least one sensor; and
determining that the individual is within a predetermined distance of the computing device.

20. The method of claim 19, comprising:
outputting a notification after the individual is determined to be within the predetermined distance of the computing device.

21. The method of claim 19, comprising:
creating a record of movement of the individual about the area over time.

22. The method of claim 21, comprising:
augmenting the record of movement of the individual with information regarding one or more guests that accompany the individual in the area.

23. The method of claim 19, comprising:
querying for the identity estimate of the individual and the level of certainty indicator when the individual is determined to be within the predetermined distance of the computing device.

24. The method of claim 19, wherein the predetermined distance is 1 to 2 feet.

25. The method of claim 17, comprising:
receiving information that indicates that the individual has moved away from the computing device or has disengaged from the computing device; and
deciding whether to revoke the certificate when it is determined that the individual has moved away from the computing device or has disengaged from the computing device.

26. The method of claim 17, comprising:
detecting, with one or more sensors, presence and location of the individual.

27. The method of claim 17, comprising:
periodically updating, the identity estimate and the level of certainty indicator.

28. The method of claim 17, wherein the comparing includes using at least one of the dynamic biometric data, or the dynamic contextual data as an index to the memory for an indirect comparison, and receiving the other of the stored biometric data and the stored contextual data in response thereto for a direct comparison to the other of the dynamic biometric data and the dynamic contextual data.

29. The method of claim 17, wherein the level of certainty indicator is at least one number.

30. The method of claim 17, comprising:
identifying that the first identity estimate is one of the identity estimate with a highest level of certainty indicator; and
identifying that the second identity estimate is one of the identity estimate with a second highest level of certainty indicator.

31. The method of claim 17, wherein
the level of certainty indicator is determined by weighting each type of the dynamic contextual data and the dynamic biometric data according to a respective reliability factor, and
the dynamic contextual data and the dynamic biometric data include multiple types of data.

* * * * *